(12) United States Patent
Yasuda et al.

(10) Patent No.: US 7,145,659 B2
(45) Date of Patent: Dec. 5, 2006

(54) LIGHT INTERFERENCE MEASUREMENT METHOD USING COMPUTER-GENERATED HOLOGRAM, AND INTERFEROMETER USING THIS METHOD

(75) Inventors: Kenji Yasuda, Saitama (JP); Shinichi Matsuda, Saitama (JP)

(73) Assignee: Fujinon Corporation, Saitama (JP)

( * ) Notice: Subject to any disclaimer, the term of this patent is extended or adjusted under 35 U.S.C. 154(b) by 233 days.

(21) Appl. No.: 10/994,270

(22) Filed: Nov. 23, 2004

(65) Prior Publication Data
US 2005/0117167 A1 Jun. 2, 2005

(30) Foreign Application Priority Data
Nov. 27, 2003 (JP) .............................. 2003-397327

(51) Int. Cl.
G01B 9/021 (2006.01)
G01B 11/02 (2006.01)
(52) U.S. Cl. ...................................... 356/458; 356/512
(58) Field of Classification Search ................ 356/457, 356/458, 508, 510, 511, 512, 513, 514; 359/15, 359/22; 73/656
See application file for complete search history.

(56) References Cited
U.S. PATENT DOCUMENTS
5,039,223 A * 8/1991 Gemma et al. ............. 356/458
5,424,828 A * 6/1995 Minami ....................... 356/458
6,885,460 B1 * 4/2005 Morita ......................... 356/514

FOREIGN PATENT DOCUMENTS
JP 8-110214 4/1996

* cited by examiner

Primary Examiner—Gregory J Toatley, Jr.
Assistant Examiner—Michael A. Lyons
(74) Attorney, Agent, or Firm—Snider & Associates; Ronald R. Snider

(57) ABSTRACT

The present invention makes it possible to reliably hold a computer-generated hologram 17 and a sample surface 18a in ideal design positions and to perform interference measurements on the surface shape of the sample surface 18a by holding the computer-generated hologram 17 in a predetermined attitude by using a retaining member, and interposing a spacer 45 between this retaining member and the object so that relative positioning of both the computer-generated hologram 17 and the sample surface 18a is performed. Light transmission type targets used for alignment are respectively disposed on the four corners of the frame body of the CGH 17 and the four corners of the measurement mirror 18, and the system is devised so that images of these targets can be obtained by an image focusing lens 43 and CCD camera 44, thus making it possible to check the adjustment of the alignment of the CGH 17 and sample surface 18a.

10 Claims, 4 Drawing Sheets

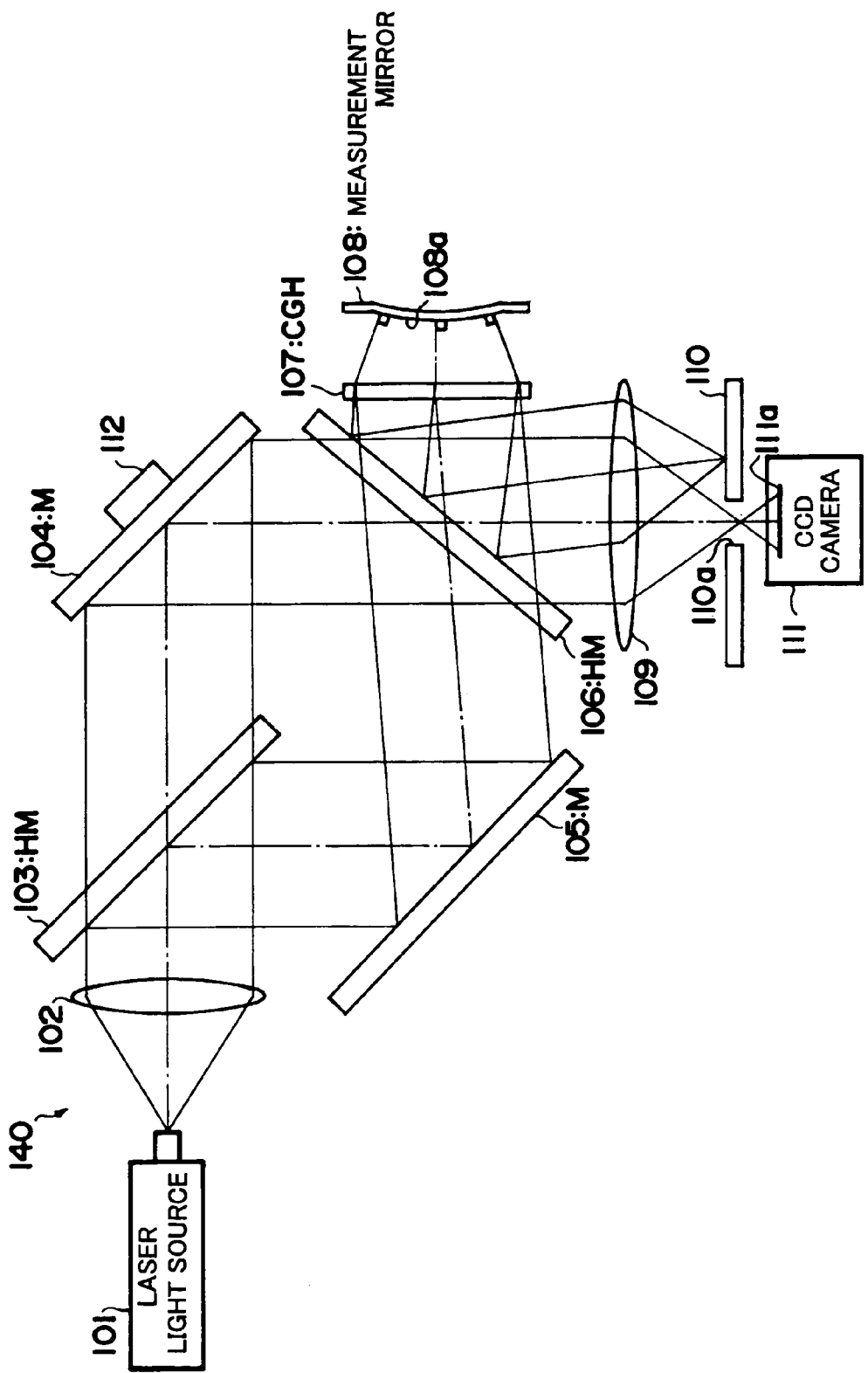

LIGHT INTERFERENCE MEASUREMENT METHOD USING COMPUTER-GENERATED HOLOGRAM, AND INTERFEROMETER USING THIS METHOD

RELATED APPLICATION

This application claims the priority of Japanese Patent Application No. 2003-397327, which is incorporated herein by reference.

BACKGROUND OF THE INVENTION

1. Field of the Invention

The present invention relates to an alignment method in interference measurements using a hologram, and an interferometer using this method. More particularly, the present invention relates to a light interference measurement method using a computer-generated hologram in which, when the surface shape of an aspherical mirror or the like is measured using an interferometer, the object and a hologram that is disposed in the optical path of the illuminating light beam directed onto the object are set in a predetermined positional relationship, and an interferometer using this method.

2. Description of the Prior Art

In recent years, methods have become known in which aspherical surfaces are formed on predetermined surfaces of optical members in order to make it possible to obtain a good optical performance using even a small number of optical members. In the case of large mirrors and the like as well, mirrors in which the reflective surface is formed as an aspherical surface have begun to be used.

Interferometers using computer-generated holograms are known as means for performing surface shape measurements on such aspherical surfaces with a high degree of accuracy (for example, see Japanese Unexamined Patent Publication No. HEI 8-110214).

Furthermore, an interferometer constructed as shown in FIG. 4 in order to perform surface shape measurements on aspherical mirrors is known as another interferometer using such a computer-generated hologram.

Specifically, this device 140 is formed overall as a Mach-Zender type interferometer; diffused light output from a coherent light source (laser light source) 101 is converted into parallel light by a collimator 102, and is split into two light beams by a half-mirror 103. One light beam is reflected by the reflective surface (reference surface) of a mirror 104 and is used as reference light. The other light beam is reflected by a mirror 105, and is directed onto the sample surface 108a of the measurement mirror 108 via a half-mirror 106 and CGH (computer-generated hologram) 107. This light beam is reflected by the sample surface 108a, and is used as object light.

The abovementioned second light beam is constructed so that this beam is directed substantially perpendicularly onto the various parts of the sample surface 108a by the CGH (computer-generated hologram) 107. Accordingly, the object light that is reflected by this sample surface 108a advances over the incident light path in substantially the opposite direction, thus reaching the CGH (computer-generated hologram) 107 and then the half-mirror 106. However, if the sample surface 108a deviates from the ideal design shape, this surface has a wave surface shape corresponding to the amount of this deviation.

Accordingly, the reference light from the abovementioned mirror 104 that passes through this half-mirror 106 and the object light from the abovementioned sample surface 108a reflected by this half-mirror 106 interfere with each other, and this interference light passes through an image focusing lens 109 and the central through-hole 110a of a filter 110 that removes unnecessary diffracted light and the like, and forms interference fringes corresponding to the surface shape of the abovementioned sample surface 108a on the imaging plane 111a of a CCD camera 111.

Subsequently, the abovementioned interference fringe image information obtained by the CCD camera 111 is sent to an image analysis part (not shown in the figures), and the surface shape of the abovementioned sample surface 108a is analyzed by this image analysis part. Furthermore, in order to facilitate the automation of this analysis processing, a piezo-actuator 112 that is used to perform a fringe scan is attached to the mirror 104 that produces the abovementioned reference light.

SUMMARY OF THE INVENTION

In cases where interference measurements are thus performed on a sample surface 108a using a CGH 107, as is described above, the relative positions of the CGH 107 and sample surface 108a must be accurately adjusted so that diffracted light from the CGH 107 is perpendicularly incident on various parts of the sample surface 108a, and so that reflected light from these various parts advances over the incident light path to the sample surface 108a in the opposite direction. If this adjustment is even slightly insufficient, so that a positional deviation is generated between these two parts, interference fringes corresponding to this positional deviation will be generated, so that accurate measurement becomes impossible, and the meaning of the measurement is lost.

The present invention is devised in light of such facts; it is an object of the present invention to provide a light interference measurement method using a computer-generated hologram, and an interferometer using this method, which make it possible to adjust the relative positional relationship between the computer-generated hologram and the sample surface easily and with a high degree of precision when interference measurements are performed on a sample surface using a computer-generated hologram, so that the surface shape of the sample surface can be measured in a favorable manner.

The light interference measurement method using a computer-generated hologram provided by the present invention is a light interference measurement method comprising the steps of: splitting light from a coherent light source into two light beams; irradiating a reference surface with a first light beam of these light beams so that reflected light from this reference surface is obtained as reference light; irradiating the sample surface of the object with a second light beam via the computer-generated hologram so that reflected light from this sample surface is obtained as object light; and measuring the surface shape of the sample surface on the basis of interference fringes obtained by light wave interference between the reference light and the object light, the measurement method further comprising the steps of: holding the computer-generated hologram by a retaining member so that this hologram adopts an attitude with respect to an alignment light beam, and so that the computer-generated hologram is disposed in a predetermined position, and holding the object on a substrate; performing relative positioning of the computer-generated hologram and the sample surface by interposing a spacer between the retaining member and the object or the substrate; and subsequently measuring the surface shape of the sample surface by arranging the system so that the second light beam is caused to be incident on the computer-generated hologram at a predetermined angle of inclination.

Here, the above-mentioned "object" includes various types measurement body, for example a mirror stated hereinafter, that can be measured using an interferometer.

Furthermore, it is desirable that the abovementioned light interference measurement method further comprises a step of forming one or more targets on both the retaining member and the object, respectively so that the positions of respective targets coincide with each other in the plane perpendicular to the optical axis when the adjustment of the alignment of the computer-generated hologram and the sample surface is performed, a step of causing the light beam used for the adjustment of the alignment to be perpendicularly incident on the computer-generated hologram during this adjustment of the alignment, and a step of adjusting the relative positions of the computer-generated hologram and the sample surface so that the positions of the respective targets of both parts coincide with each other in the plane in a state in which the retaining member, the spacer and the object are disposed in that order in tight contact with each other.

In this case, it is desirable that the targets formed on both the retaining member and the object can be detected by transmitted light, and that the adjustment of the relative positions of the computer-generated hologram and the sample surface be performed according to whether or not the images of the targets formed on both of the parts are mutually superimposed on a imaging plane.

Furthermore, in the abovementioned light interference measurement method, the retaining member and the spacer comprise positioning engaging parts that can engage with each other, and the relative positioning of the computer-generated hologram and the sample surface can be performed by causing these positioning engaging parts to engage with each other.

Furthermore, the interferometer of the present invention is an interferometer in which light from a coherent light source is split into two light beams, a reference surface is irradiated with a first light beam of these light beams so that reflected light from this reference surface is obtained as reference light, the sample surface of the object is irradiated with a second light beam via a computer-generated hologram so that reflected light from this sample surface is obtained as object light, and the surface shape of the sample surface is measured on the basis of interference fringes obtained by light wave interference between the reference light and the object light, the interferometer comprising: a retaining member which holds the computer-generated hologram so that this hologram has a predetermined angle of inclination with respect to the incident light beam, and so that this hologram is disposed in a predetermined position, and a substrate that holds the object; one or more targets formed on both the retaining member and the object so that the positions of respective targets in the plane perpendicular to the optical axis coincide with each other when the adjustment of the alignment of the computer-generated hologram and the object is performed; and a spacer interposed between the retaining member and the object or the substrate, wherein the substrate is held on a position adjustment member that adjusts the relative positions of the retaining member and the object in two perpendicular axial directions in the plane and in the direction of rotation about the optical axis, the interferometer further comprising: switching apparatus for performing switching so that the light beam used for the adjustment of the alignment is perpendicularly incident on the computer-generated hologram during the adjustment of the alignment, and so that the second light beam is incident on the computer-generated hologram at an inclined angle during the measurement of the surface shape of the sample surface; and imaging apparatus for obtaining information that is used to judge whether or not the positions of the respective targets of both of the parts coincide with each other in the plane.

Furthermore, in the abovementioned interferometer, the light source that emits the light beam used for the adjustment of the alignment can be constructed as a light source that is separate from the coherent light source, and the switching apparatus can be constructed as means for alternatively driving these two light sources.

Moreover, in the abovementioned interferometer, the light source that emits the light beam used for the adjustment of the alignment can be constructed as the same light source as the coherent light source, and the switching apparatus can be constructed as means for varying the amount of deflection of a light deflecting element that deflects the second light beam in the direction of the computer-generated hologram.

Furthermore, the abovementioned "retaining member" includes both a frame body that supports the computer-generated hologram and members that attach this frame body to the apparatus housing or the like.

BRIEF DESCRIPTION OF THE DRAWINGS

FIG. 4 is a schematic drawing showing a conventional interferometer.

DESCRIPTION OF THE PREFERRED EMBODIMENTS

Figure 1:
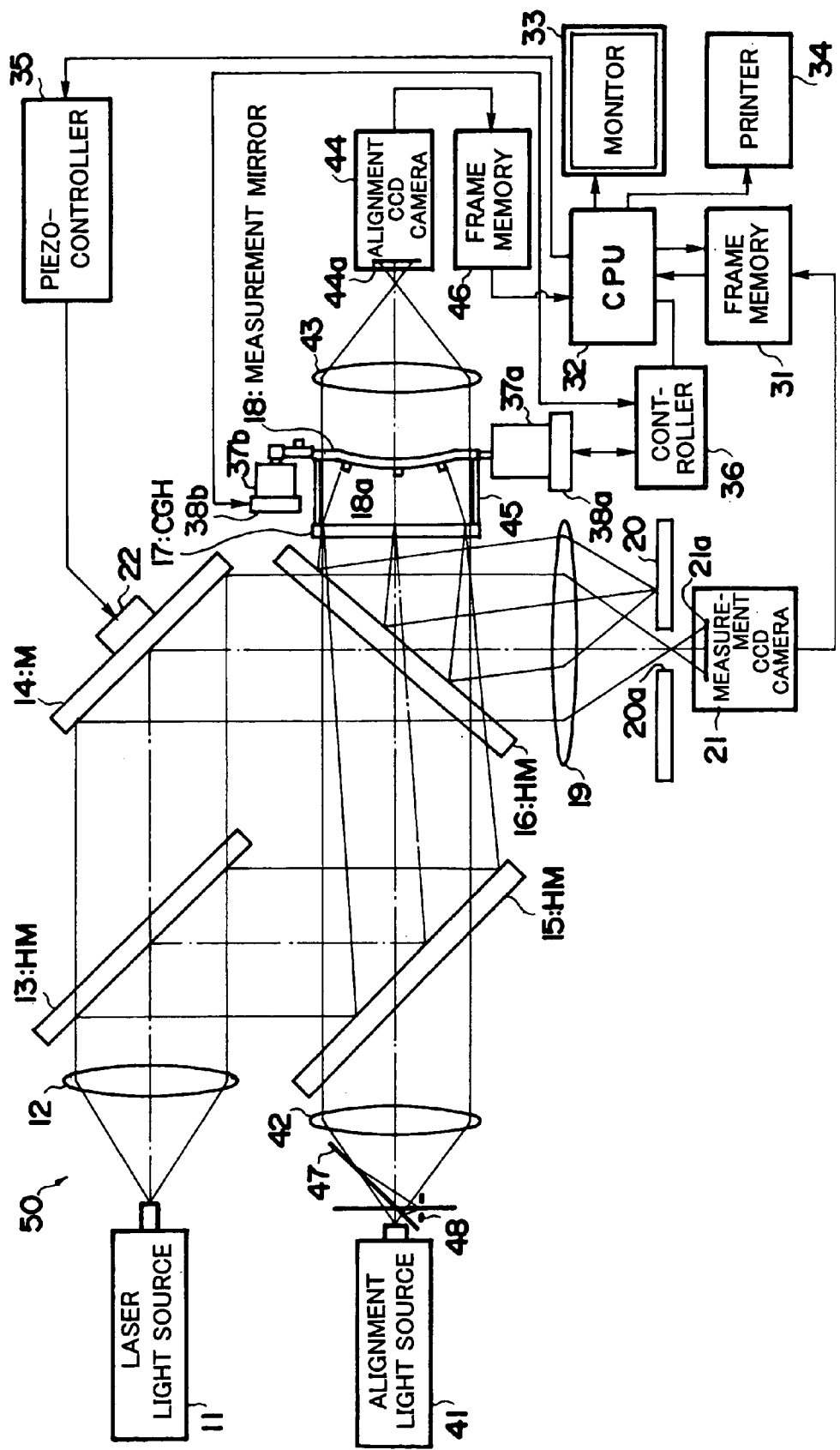
FIG. 1 is a schematic drawing showing the construction of the interferometer of the present invention.

Embodiments of the present invention will be described below with reference to the attached figures. FIG. 1 is a schematic drawing which shows an interferometer constituting one embodiment of the present invention.

The interferometer 50 shown in FIG. 1 is formed as a Mach-Zender type interferometer like the interferometer of the prior art illustrated in FIG. 4. Like the conventional interferometer, this interferometer comprises a main measurement optical system that measures the surface shape of a measurement mirror (this is also referred to an object). However, the characterizing feature of the interferometer 50 of this embodiment is that this interferometer comprises an alignment optical system that is combined with this main measurement optical system. Accordingly, the alignment optical system in particular will be described in detail, and only a brief description of the main measurement optical system will be given.

In this interferometer 50, diffused light that is output from a coherent light source (laser light source) 11 is converted into parallel light by a collimator 12, and is split into two light beams by a half-mirror 13. One of these light beams is reflected by the reflective surface (reference surface) of a mirror 14, and is used as reference light, and the other light beam is reflected by a half-mirror 15, directed onto the sample surface 18a of a measurement mirror 18 via a half-mirror 16 and CGH (computer-generated hologram) 17, reflected by this sample surface 18a and used as object light. Furthermore, the light beam from the half-mirror 15 is set so that this light beam is incident on the CGH 17 at an inclination; as a result, the specular light from the CGH 17 can be prevented from causing noise. Furthermore, the CGH 17 is held on a frame body (the frame body 17a shown in FIG. 2), and this frame body is held on (for example) the apparatus housing by retaining members so that the relative positional relationship with the incident light is maintained.

The CGH 17 diffracts the abovementioned second light beam, and is constructed so that diffracted light of a specified order number is directed substantially perpendicularly onto the sample surface 18a; accordingly, the object light that is reflected by this sample surface 18a advances over the incident light path in substantially the opposite direction, and reaches the CGH 17 and then the half-mirror 16.

If the abovementioned sample surface 18a deviates from the ideal design shape, the object light has a wave front shape that corresponds to this amount of deviation. Accordingly, the interference light that is generated when the reference light from the abovementioned half-mirror 13 that passes through this half-mirror 16 and the abovementioned object light that is reflected by this half-mirror 16 carries interference fringe information that corresponds to the amount of deviation of the sample surface 18a from the ideal design shape.

Subsequently, the abovementioned interference light passes through an image focusing lens 19 and the central through-hole 20a of a filter 20, and forms interference fringes corresponding to the surface shape of the abovementioned sample surface 18a on the imaging plane 21a of a CCD camera 21 used for measurement.

Furthermore, the abovementioned interference fringe image information obtained by the CCD camera 21 is converted into a digital signal and stored in a frame memory 31; afterward, interference fringe images are displayed in a desired display format by a monitor 33 or printer 34 according to instructions from the CPU 32. Furthermore, in the CPU 32, an image analysis part is constructed on the basis of a specified program, and the surface shape of the abovementioned sample surface 18a is analyzed by this image analysis part. Furthermore, in order to facilitate the automation of this analysis, a piezo-actuator 22 used for the employment of a fringe scanning method is attached to the mirror 14 that produces the abovementioned reference light, and is driven at a specified timing by a piezo-controller 35 that is actuated in accordance with instructions from the CPU 32.

As is described above, the apparatus of the present embodiment comprises an alignment optical system that is combined with the abovementioned main measurement optical system.

Specifically, as is described above, in an apparatus that performs light interference measurements on a sample surface 18a using a CGH 17, if the diffracted light from the CGH 17 is incident on the sample surface 18a at even a slight inclination as a result of the adjustment of the alignment of the CGH 17 and sample surface 18a being inadequate so that a slight deviation is generated between the two parts, interference fringes that correspond to this positional deviation will be generated, so that it becomes difficult to perform accurate measurements. Accordingly, adjustment of the alignment of the CGH 17 and sample surface 18a is performed using the abovementioned alignment optical system before the main measurement process is performed.

This alignment optical system comprises a light source (this may be a laser light source) 41, a collimator 42, an image focusing lens 43 that converges parallel light from the collimator 42 and focuses images of the alignment targets, and a CCD camera 44 used for alignment. Furthermore, the system comprises a half-mirror 47 which reflects the specular light from the CGH 17 so that this light is reflected 90 degrees in the vicinity of the emission part of the light source 41 (at a position where the light beam diameter is small), and a pinhole plate 48 that is disposed in the direction of reflection of the abovementioned specular light by this half-mirror 47. These parts are disposed so that in cases where the CGH 17 is disposed perpendicular to the optical axis, the specular light from the CGH 17 advances over the incident light path from the CGH 17 in the opposite direction, thus reaching the half-mirror 47, and is reflected by this half-mirror 47 so that this light can pass through the pinhole of the pinhole plate 48. Accordingly, the CGH 17 can be set perpendicular to the optical axis by adjusting the attitude of the CGH 17 so that the specular light from this CGH 17 passes through the pinhole plate 48.

As a result, the parallel light from the collimator 42 can be set so that this light is perpendicularly incident on the CGH 17.

Furthermore, light transmission type targets are respectively disposed on the four corners of the frame body of the CGH 17 and the four corners of the measurement mirror 18, and the system is constructed so that the positions of the corresponding targets on both of these parts in the plane perpendicular to the optical axis are mutually identical in a state in which the alignment of the CGH 17 and sample surface 18a is performed in a favorable manner (details of this will be described later).

Accordingly, the parallel light from the collimator 42 is perpendicularly incident on the CGH 17, the transmitted light is further incident on the measurement mirror 18, and the parallel light that passes through both of these parts (respective partial regions) is converged by the image focusing lens 43, so that images of the respective targets disposed on the frame body of the CGH 17 and the measurement mirror 18 are formed on the imaging plane 44a of the alignment CCD camera 44; in cases where the alignment of the CGH 17 and sample surface 18a is good, images of the corresponding targets on both of these parts are acquired in a mutually superimposed state. The system is constructed so that after the acquired image information is converted into digital information, this information is input into the CPU 32 via the frame memory 46, and is displayed (for example) on the abovementioned monitor 33.

Furthermore, in cases where the images of the corresponding targets on both of the abovementioned parts deviate from each other, the controller 36 drives an XY movement actuator 37a and a rotational movement actuator 37b in accordance with instructions from the CPU 32 so that the measurement mirror 18 is subjected to a parallel movement adjustment in the directions of two perpendicular axes (X axis and Y axis) in the plane perpendicular to the optical axis and a rotational movement adjustment about the optical axis until the images of the corresponding targets on both of the abovementioned parts coincide with each other, thus producing a favorable alignment of the CGH 17 and sample surface 18a.

Furthermore, the system is devised so that the position of the measurement mirror 18 in the directions of the abovementioned two axes and the position of the measurement mirror 18 in the abovementioned rotational direction are recognized by means of the output values from encoders 38a and 38b installed on the respective actuators 37a and 37b, and so that the abovementioned parallel movement adjustment and the abovementioned rotational movement adjustment are respectively controlled by a comparative judgment with specified reference values in the CPU 32.

Furthermore, a hollow spacer 45 is disposed between the frame body of the abovementioned CGH 17 and the abovementioned measurement mirror 18, and the system is devised so that the relative distance between the CGH 17 and sample surface 18a in the direction of the optical axis is maintained at a fixed distance by interposing the spacer 45 so that this spacer is in tight contact with both the frame body of the CGH 17 and the measurement mirror 18.

Figure 2:
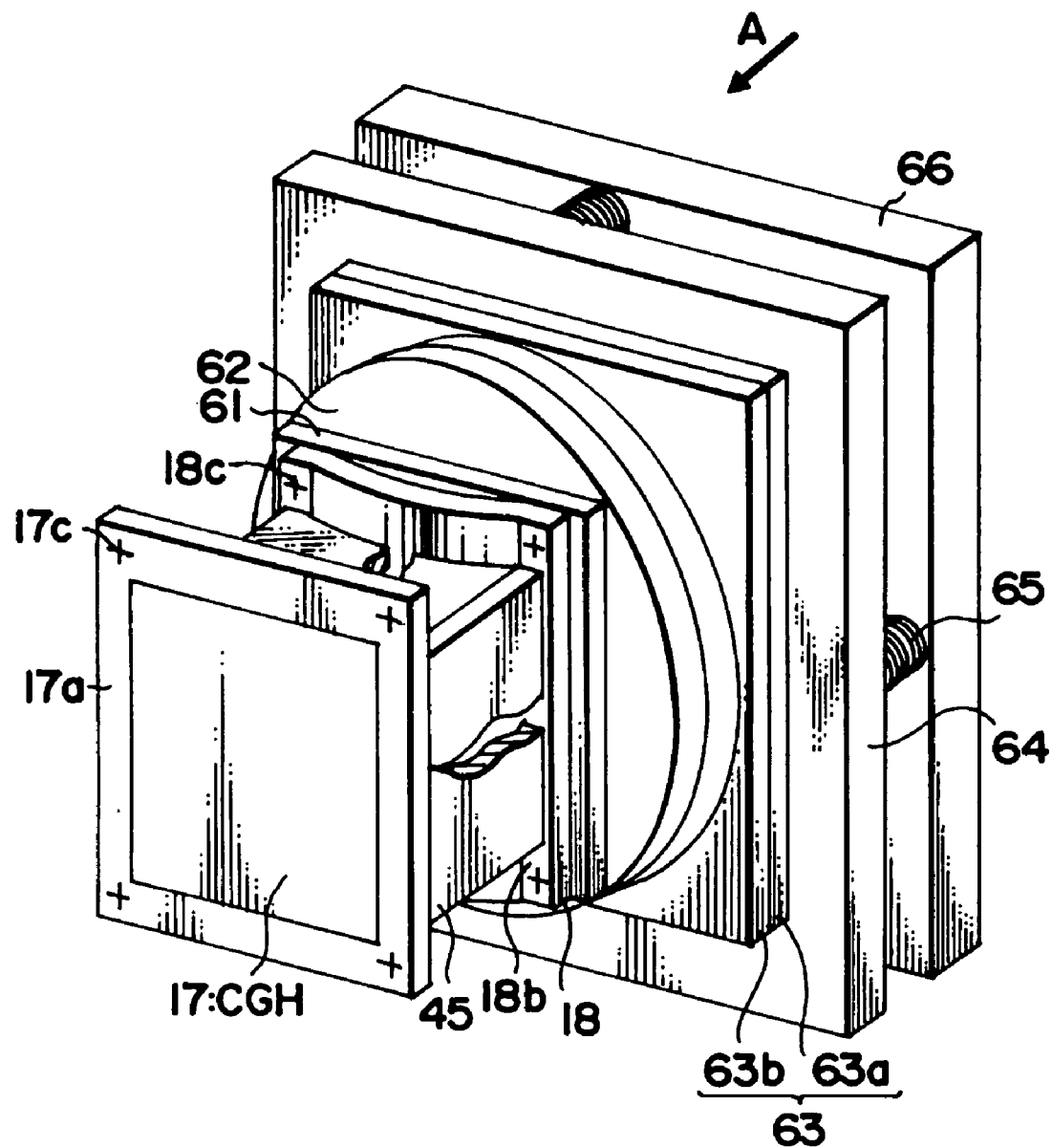
FIG. 2 is a schematic perspective view showing in detail a portion of the interferometer shown in FIG. 1.

FIG. 2 is a schematic drawing which is used to illustrate the mechanism that adjusts the positions of the abovementioned targets and measurement mirror 18. Furthermore, in FIG. 2, the CGH 17 is shown as being disposed in an upright attitude; preferably, however, this CGH 17 is disposed in a horizontal attitude above the mechanism that adjusts the position of the measurement mirror 18, so that the effect of the pressing force that is applied to the CGH 17 from the spacer 45 is controlled.

As is shown in the figures, respective alignment targets 17c and 18c are formed on the four corners of the frame body 17a positioned on the outside part of the CGH 17 (pattern region) and the four corners of the holding region 18b of the measurement mirror 18. These targets 17c on the frame body 17a and targets 18c on the measurement mirror 18 are formed by the transfer of the same masks, and are transmitted light type targets with a cruciform shape.

Furthermore, a hollow frame type spacer 45 is disposed between the frame body 17a of the CGH 17 and the measurement mirror 18 so that this spacer tightly contacts both of the abovementioned parts 17a and 18. The sample surface 18a of the abovementioned measurement mirror 18 has a non-spherical surface shape, and the CGH 17 is formed so that the incident parallel light passes through the hollow part of the spacer 45, and is diffracted so that this light is perpendicularly incident on various positions of the sample surface 18a disposed at a specified distance from this CGH 17. Accordingly, the CGH 17 and sample surface 18a must be disposed at a specified predetermined distance from each other; in this case, the distance between the CGH 17 and sample surface 18a in the direction of the optical axis is maintained at a fixed distance by thus interposing the spacer 45 in tight contact between the frame body 17a of the CGH 17 and the measurement mirror 18.

Furthermore, the end surface of the abovementioned spacer 45 on the side of the measurement mirror 18 is formed with a shape that substantially conforms to the sample surface 18a. Moreover, in FIG. 2, a portion of the side wall part is cut away, thus showing that the interior of the spacer 45 is hollow.

Meanwhile, as is shown in FIG. 2, the mechanism that adjusts the position of the abovementioned measurement mirror 18 comprises a measurement mirror carrying substrate 61 that carries and holds the measurement mirror 18, a rotating table 62 that adjusts the position of the abovementioned measurement mirror 18 in the direction of rotation about the optical axis in a state in which this substrate 61 is carried and held, an XY table 63 that adjusts the position of the abovementioned measurement mirror 18 in the direction of the X axis and direction of the Y axis in a state in which this rotating table 62 is carried and held, a base 64 that carries and holds this XY table 63, and a pressure plate 66 that has a plurality of pressure springs 65 on the surface facing this base 64, and that presses the base 64 in the direction indicated by the arrow A by means of these pressure springs 65. Moreover, the mechanism is devised so that the pressure plate 66 is held on the apparatus housing.

Furthermore, the abovementioned XY table 63 has a two-stage structure comprising an X-axis adjustment table 63a and a Y-axis adjustment table 63b.

The rotating table 62 and XY table 63 are respectively driven by the abovementioned rotational movement actuator 37b and XY movement actuator 37a, and the system is constructed so that the controller 36 actuates the XY movement actuator 37a and rotational movement actuator 37b on the basis of instructions from the CPU 32 in accordance with the amount of deviation of the images of the corresponding targets 17c and 18c of the frame body 17a and measurement mirror 18 as described above, thus causing a positional adjustment to be performed until the images of the corresponding targets of both of the abovementioned parts coincide with each other, so that a favorable alignment of the CGH 17 and sample surface 18a is obtained.

Furthermore, as is described above, the pressure plate 66 is constructed so that this plate presses the base 64 in the direction indicated by the arrow A; as a result, the spacer 45 is clamped between the measurement mirror 18 and the frame body 17a of the CGH 17, so that the distance between the sample surface 18a and the CGH 17 in the direction of the optical axis is maintained at the desired design value, and the positioning of the sample surface 18a and CGH 17 in the direction of the optical axis is completed.

In the present embodiment, the adjustment of the alignment of the CGH 17 and sample surface 18a is reliably performed by the respective adjustment operations described above; as a result, the measurement light that is incident on the CGH 17 at a predetermined angle of incidence can be caused to be perpendicularly incident on various parts of the sample surface 18a of the measurement mirror 18 having the aspherical surface.

Furthermore, although this is not shown in the figures, through-holes are formed in the substrate 61, rotating table 62, XY table 63, base 64 and pressure plate 66 (or else these members are formed as transparent members) so that the transmitted light of the respective targets 17c and 18c can be transmitted through these parts; as a result, images of the respective targets 17c and 18c can be obtained by the abovementioned alignment CCD camera 44.

Figure 3A:
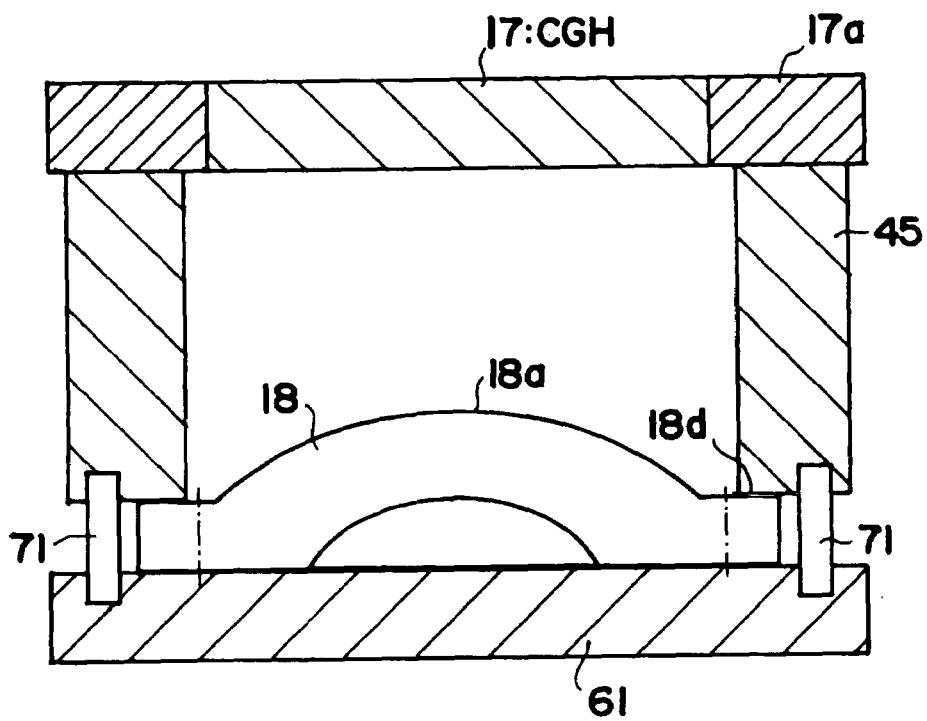
FIG. 3A is a schematic sectional view showing the contact relationship of the CGH, spacer and object in the embodiment shown in FIG. 1.

Furthermore, FIG. 3A is a schematic drawing showing the contact relationship of the frame body 17a of the CGH 17, spacer 45 and measurement mirror 18. Specifically, the frame body 17a of the CGH 17 and one end surface of the spacer 45 are disposed in a state in which these parts are maintained in tight contact with each other as described above. However, these parts are disposed in a manner that allows mutual sliding movement so that the abovementioned relative parallel movement adjustment and rotational movement adjustment of the CGH 17 and sample surface 18a are possible.

Furthermore, the substrate 61 and the other end surface of the spacer 45 are mutually connected and held by a connecting member (connecting pin) 71, and a portion of the other end surface of the spacer 45 contacts a reference surface 18*d* disposed on the side of the sample surface 18*a* of the measurement mirror 18, so that relative positioning of the CGH 17 and sample surface 18*a* is reliably performed. Moreover, the measurement mirror 18 is held on the substrate 61 by means of screws, adhesives or the like.

In regard to the procedure whereby the adjustment of the alignment of the measurement mirror 18 is performed using the abovementioned interferometer 50, the CGH 17 is first held on the apparatus housing or the like in a state in which the system has been adjusted so that the alignment light beam from the light source 41 is perpendicularly incident on the CGH 17 as described above. Then, the measurement mirror 18 is disposed in a state in which the relative position with respect to the CGH 17 has been adjusted as described above. Then, a light source switching operation which places the light source 41 in an OFF state and which places the coherent light source 11 in an ON state is performed (this is performed by operating switching means (switching apparatus) either automatically or manually), so that the main measurement for the sample surface 18*a* of the abovementioned measurement mirror 18 is initiated.

Furthermore, the light interference measurement method using a computer-generated hologram provided by the present invention is not limited to the abovementioned method; various alterations are possible. Moreover, various alterations are similarly possible in the case of the interferometer of the present invention.

For example, in the light interference measurement method using a computer-generated hologram provided by the present invention, if the system is constructed so that the relative positioning of the computer-generated hologram and the sample surface is performed by interposing a spacer with a predetermined shape between the retaining member that holds the computer-generated hologram and the substrate that holds the measurement mirror, and is also constructed so that not only the positioning in the direction of the optical axis but also the abovementioned positioning in the directions of the X and Y axes and positioning in the rotational direction can be performed structurally with good precision by means of this spacer, then the parallel movement adjustment in the directions of the X and Y axes and rotational movement adjustment in the abovementioned embodiment are not absolutely necessary.

Figure 3B:
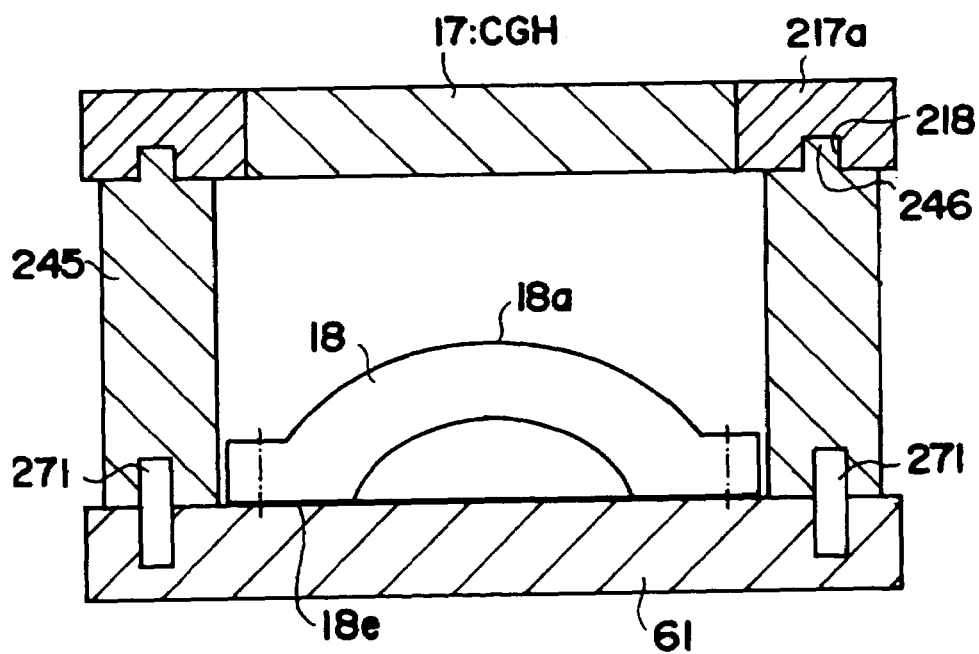
FIG. 3B is a schematic sectional view showing a modification of the contact relationship shown in FIG. 3A.

For example, a plurality of engaging protruding parts 246 may be disposed on the end surface of the spacer 245 located on the side of the frame body 217*a*, a plurality of engaging recessed parts 218 that can respectively engage with the abovementioned plurality of engaging protruding parts 246 may be formed in the end surface of the frame body 217*a* located on the side of the spacer 245, and the system may thus be constructed so that the positioning of the CGH 17 and sample surface 18*a* is reliably performed beforehand as shown in FIG. 3B. In short, a construction may be used in which a relative positional relationship is maintained in a state in which the frame body 217*a* of the CGH 17, the spacer 245 and the measurement mirror 18 are positioned. Furthermore, in this FIG. 3B, the substrate 61 and the end surface of the spacer 245 located on the side of the measurement mirror 18 are connected by means of a connecting member (connecting pin) 271 in a state of mutual contact; moreover, the surface of the measurement mirror 18 located on the side of the substrate 61 is disposed in a state of contact with the substrate 61 (by means of screws, adhesives or the like) as a reference surface 18*e*. As a result, the relative positioning of the CGH 17 and sample surface 18*a* can be reliably performed.

Furthermore, the system may be constructed so that in the state shown in FIG. 3B, the end surface of the spacer 245 located on the side of the measurement mirror contacts the reference surface positioned on the upper surface of the measurement mirror 18 as in the configuration shown in FIG. 3A; moreover, in the state shown in FIG. 3B, the end surface of the spacer 245 located on the side of the frame body 217*a* and the surface of the frame body 217*a* located on the side of the spacer 245 may be devised so that mutual sliding movement is possible as in the configuration shown in FIG. 3A.

Furthermore, in the abovementioned embodiment, the apparatus comprises an alignment light source 41 in addition to a coherent light source (laser light source) 11; however, it would also be possible to endow the coherent light source 11 with a function of such an alignment light source 41, and to use only a single light source.

However, it is necessary that the light beam used for the main measurement process be caused to be incident on the CGH 17 from an inclined angle; on the other hand, it is necessary that the alignment light beam be caused to be perpendicularly incident on the CGH 17. Accordingly, in case where a single light source is used, for example, the angle of inclination of the reflective surface of the half-mirror 15 is made variable by predetermined inclination angle switching means (operated either automatically or manually); as a result, the angle of deflection of the light beam from the half-mirror 13 can be varied.

Furthermore, in the abovementioned embodiment, the system is devised so that the images of the targets 17*c* and 18*c* can be recognized by means of transmitted light; however, it would also be possible to form the targets from a material that can reflect light, and to devise the system so that the images of the targets are recognized by means of reflected light. In this case, the function of the alignment CCD camera 44 can be combined with that of the measurement CCD camera 21 in the abovementioned embodiment, so that the alignment CCD camera 44 can be omitted.

Furthermore, the object is not limited to a mirror; various types of objects that can be measured using an interferometer may be used as objects. Moreover, the sample surface is not limited to a non-spherical surface shape; surfaces with a spherical surface shape and surfaces with other surface shapes can be used as sample surface.

Moreover, the interferometer of the abovementioned embodiment comprises a Mach-Zender type interferometer; however, a similar action and effect can also be obtained in the case of other interferometers with an equal optical path length such as Michaelson type interferometers or the like, or interferometers with an unequal optical path length such as Fizeau type interferometers or the like.

In the light interference measurement method using a computer-generated hologram provided by the present invention, the computer-generated hologram and sample surface can be securely held in the ideal design position by holding the computer-generated hologram in a predetermined attitude by means of the retaining member, and performing relative positioning of both the computer-generated hologram and the sample surface by interposing a spacer with a predetermined shape between the retaining member and the object or substrate holding this object.

Furthermore, in the interferometer of the present invention, since respective targets whose positions coincide with each other in the plane perpendicular to the optical axis when the adjustment of the alignment of the computer-generated hologram and the sample surface is favorably performed be formed on both the retaining member and the object (with at least one of these targets being formed on each of these parts), and since the relative positions of the computer-generated hologram and the sample surface are adjusted so that the light beam used for adjustment of the alignment is perpendicularly incident on the computer-generated hologram, and so that the positions of the respective targets on the computer-generated hologram and object coincide with each other in the plane perpendicular to the optical axis, during the adjustment of this alignment, adjustment by means of parallel movement and rotational movement in the plane perpendicular to the optical axis is easy.

Accordingly, the relative positional relationship of the computer-generated hologram and the sample surface can be adjusted easily and with high precision, and subsequent measurement of the surface shape of the sample surface can be performed in a favorable manner.

What is claimed is:

1. A light interference measurement method using a computer-generated hologram, comprising:

splitting light from a coherent light source into two light beams;

irradiating a reference surface with a first light beam of said light beams to obtain reflected light from this reference surface as reference light;

irradiating a sample surface of a object with a second light beam via a computer-generated hologram to obtain reflected light from said sample surface as object light; and measuring the surface shape of said sample surface on the basis of interference fringes obtained by light wave interference between said reference light and said object light, the measurement method further comprising:

holding said computer-generated hologram by a retaining member so that said computer-generated hologram adopts an attitude with respect to an alignment light beam, and so that said computer-generated hologram is disposed in a predetermined position;

holding said object on a substrate;

performing relative positioning of said computer-generated hologram and said sample surface by interposing a spacer between said retaining member and said object or said substrate; and subsequently measuring the surface shape of said sample surface by causing said second light beam to be incident on said computer-generated hologram at a predetermined angle of inclination.

2. The light interference measurement method using a computer-generated hologram according to claim 1, further comprising:

forming one or more targets on both said retaining member and said object, respectively, so that the positions of respective targets coincide with each other in a plane perpendicular to the optical axis when the adjustment of the alignment of said computer-generated hologram and said sample surface is performed;

causing the light beam used for said adjustment of the alignment to be perpendicularly incident on said computer-generated hologram during this adjustment of the alignment; and adjusting the relative positions of said computer-generated hologram and said sample surface so that the positions of the respective targets of both said retaining member and said object coincide with each other in said plane in a state in which said retaining member, said spacer and said object are disposed in that order in tight contact with each other.

3. The light interference measurement method using a computer-generated hologram according to claim 2, wherein the targets formed on both said retaining member and said object can be detected by transmitted light, and the adjustment of the relative positions of said computer-generated hologram and said sample surface is performed according to whether or not the images of the targets formed on both of the parts are mutually superimposed on an imaging plane.

4. The light interference measurement method using a computer-generated hologram according to claim 1, wherein said retaining member and said spacer comprise positioning engaging parts that can engage with each other, and the relative positioning of said computer-generated hologram and said sample surface can be performed by causing these positioning engaging parts to engage with each other.

5. An interferometer in which light from a coherent light source is split into two light beams, a reference surface is irradiated with a first light beam of these light beams to obtain reflected light from this reference surface as reference light, the sample surface of an object is irradiated with a second light beam via a computer-generated hologram to obtain reflected light from this sample surface as object light, and the surface shape of said sample surface is measured on the basis of interference fringes obtained by light wave interference between said reference light and said object light, the interferometer comprising:

a retaining member which holds said computer-generated hologram so that this computer-generated hologram has a predetermined inclination with respect to an incident light beam, and so that this computer-generated hologram is disposed in a predetermined position;

a substrate that holds said object;

one or more targets formed on both said retaining member and said object so that the positions of respective targets in a plane perpendicular to the optical axis coincide with each other when the adjustment of the alignment of said computer-generated hologram and said object is performed; and a spacer interposed between said retaining member and said object or said substrate, said substrate being held on a position adjustment member that adjusts the relative positions of said retaining member and said object in two perpendicular axial directions in said plane and in the direction of rotation about said optical axis, the interferometer further comprising:

switching apparatus for performing switching so that the light beam used for the adjustment of the alignment is perpendicularly incident on said computer-generated hologram during the adjustment of said alignment, and so that said second light beam is incident on said computer-generated hologram at an inclined angle during the measurement of the surface shape of said sample surface; and imaging apparatus for obtaining information that is used to judge whether or not the positions of the respective targets of both said retaining member and said object coincide with each other in said plane.

6. The interferometer according to claim 5, wherein the light source that emits the light beam used for the adjustment of said alignment is a light source that is separate from said coherent light source, and said switching apparatus is means for alternatively driving these two light sources.

7. The interferometer according to claim 5, wherein the light source that emits the light beam used for the adjustment of said alignment is the same light source as said coherent light source, and said switching apparatus is means for varying the amount of deflection of a light deflecting element that deflects said second light beam in the direction of said computer-generated hologram.

8. The interferometer according to claim 5, wherein said position adjustment member comprises:
   a substrate that carries and holds said object;
   a rotating table that adjusts the position of said object in said rotational direction in a state in which said substrate is carried and held;
   an XY table that adjusts the position of said object in the directions of said two axes in a state in which said rotating table is carried and held;
   a base that carries and holds said XY table; and
   a pressure plate that has a plurality of pressure springs on the surface facing said base, and that presses said base in the direction of said optical axis by means of said pressure springs.

9. The interferometer according to claim 5, further comprising a controller which actuates said position adjustment member in accordance with the amount of deviation of the positions of said respective targets of both said retaining member and said object coincide within said plane, and which performs a position adjustment so that said respective targets coincide with each other.

10. An interferometer in which light from a coherent light source is split into two light beams, a reference surface is irradiated with a first light beam of these light beams to obtain reflected light from this reference surface as reference light, the sample surface of an object is irradiated with a second light beam via a computer-generated hologram to obtain reflected light from this sample surface as object light, and the surface shape of said sample surface is measured on the basis of interference fringes obtained by light wave interference between said reference light and said object light, the interferometer comprising:
   a retaining member which holds said computer-generated hologram so that this computer-generated hologram has a predetermined inclination with respect to an incident light beam, and so that this computer-generated hologram is disposed in a predetermined position;
   a substrate that holds said object; and
   a spacer interposed between said retaining member and said object or said substrate,
   wherein said retaining member and said spacer comprise positioning engaging parts that can engage with each other, and the relative positioning of said computer-generated hologram and said sample surface can be performed by causing these positioning engaging parts to engage with each other.

* * * * *